United States Patent [19]

Yamaji et al.

[11] 4,134,196
[45] Jan. 16, 1979

[54] METHOD OF PRODUCTION OF A WIRE-SHAPED COMPOSITE ADDITION MATERIAL

[75] Inventors: Kenkichi Yamaji; Oelhschlägel Dietrich; Hajime Abe; Koichi Tamura, all of Hitachi, Japan

[73] Assignee: Hitachi Cable Ltd., Japan

[21] Appl. No.: 652,665

[22] Filed: Jan. 27, 1976

[30] Foreign Application Priority Data

Jul. 25, 1975 [JP] Japan .................................. 50-90975

[51] Int. Cl.² .............................................. B22F 3/24
[52] U.S. Cl. ........................................ 29/420; 164/55; 75/129; 75/58; 219/145.1; 219/146.32
[58] Field of Search ................... 219/146, 145; 29/420, 29/420.5

[56] References Cited

U.S. PATENT DOCUMENTS

| | | | |
|---|---|---|---|
| 1,525,840 | 2/1925 | Weed | 219/146 |
| 1,825,829 | 10/1931 | Stoody et al. | 219/145 |
| 2,493,143 | 1/1950 | Ingels | 219/146 |
| 2,785,285 | 3/1957 | Bernard | 219/146 |
| 2,882,571 | 4/1959 | Easton | 22/200.1 |
| 2,962,579 | 11/1960 | Strohmeier | 219/146 X |
| 3,059,093 | 10/1962 | Norcross et al. | 219/145 X |
| 3,175,074 | 3/1965 | Culbertson | 219/146 |
| 3,177,573 | 4/1965 | Foerster | 29/420 |
| 3,331,680 | 7/1967 | Leupold | 75/53 |
| 3,459,537 | 8/1969 | Hornak | 75/49 |
| 3,848,109 | 11/1974 | Zvanut | 219/146 |

OTHER PUBLICATIONS

"Shrouded Electrode", Journal-Am. Weldg. Society, Apr. 1927. p. 55.

*Primary Examiner*—C. W. Lanham
*Assistant Examiner*—V. K. Rising
*Attorney, Agent, or Firm*—Craig & Antonelli

[57] ABSTRACT

An addition material in powder or particulate form comprising at least one addition agent selected from the group consisting of calcium, magnesium and aluminum is extruded to provide a compact core wire, which is enveloped by a tape of iron or steel. The tape is circularly shaped such that one widthwise marginal portion is folded tightly over the other widthwise marginal portion in overlapping relation. The tape thus shaped serves as a protective covering for the core wire. Great lengths of continuous wire can be manufactured by the continuous production process. The wire shaped composite addition material produced in this way is added to molten iron and steel by means of continuous wire feeding and hereby provides for effective deoxidation and desulfurization of such melts. Furthermore the linear additive is easy to handle and to store.

7 Claims, 4 Drawing Figures

METHOD OF PRODUCTION OF A WIRE-SHAPED COMPOSITE ADDITION MATERIAL

BACKGROUND OF THE INVENTION

This invention relates to a method of production of a wire shaped composite addition material, i.e., a linear additive, which is effective to perform deoxidation, desulfurization, control of the shape of inclusions and other treatments when added to iron and steel in a molten state, e.g. pig iron, steel, cast iron and cast steel.

It is known that various materials such as calcium, magnesium, aluminium and rare earths have the effect of deoxidation and desulfurization on moten iron and steel when added thereto. They are therefore used in suitable combinations. However, they have the disadvantage of being low in yield when added to the molten metal by a simple plunging method. This is particularly true in the case of calcium and magnesium wherein because of the low boiling points of these materials the yield is only several percents. Moreover, they raise the problem of air pollution by the gas and smoke they generate as they burn when they are added to the molten metal. Added disadvantages are that these addition agents are not only readily oxidized but also highly reactive with moisture in the air, so that difficulty is experienced in storing them. In order to overcome these shortcomings it has heretofore been proposed to protect such reactive addition materials by enclosing them tightly with a covering of iron or steel so that a composite material is obtained. Such composite addition materials have been proposed in the form of rods and wires.

If a covering is applied to the addition material, the problem of moisture absorption and oxidation will be greatly reduced or eliminated. Also, since the covering is made of iron or steel, it has no deleterious effects on the molten steel, to which the addition of the composite material is made. During the process of addition, the covering protects the reactive addition material, and as the covering material has a comparatively high melting point, it will delay the release of the addition material into the molten metal. This enables the addition material to penetrate deep into the molten metal prior to its release and reaction with the melt. Therefore losses of addition material and smoke development due to reactions at the melt surface are avoided and a very efficient use of the adding material can be obtained.

If the composite material is in the form of wire it can be handled with ease and the amount of the addition material added to the molten metal can readily be controlled. This is of special advantage if the composite material is to be added to the molten metal in the mold of continuous casting or to a stream of molten metal during pouring. However advantages can also be found for the addition of such wire shaped composite materials to the molten metal in other locations such as ladles or furnaces.

Methods for the production of linear additives as described above have been proposed, all of which have certain disadvantages:

In one method of production of such linear additives known in the art, a pipe of iron or steel is filled with an addition material and a composite wire of a desired cross-sectional area comprising the addition material can be produced by reducing the cross-sectional area. This method has a disadvantage in that the composite wire produced is short in length, as it is difficult to produce a composite wire of large length by this method.

Calcium, magnesium and aluminum are available in powder or particulate form. If they are in this form, the weight ratio of each agent to the other agents can readily be controlled by suitable mixing of the powders or particulates. Proposals have been made to use a method wherein a mixture of one or more addition agents in powder or particulate form are contained as a core in a tape of iron or steel which is formed into a tube shape as it moves along the path of its movement so that it may serve as a covering. Some disadvantages are associated with this method. When this method is used, the addition agent or agents forming the core are low in coherence and the core is not compact. Therefore, the core has a high air content. Difficulty is experienced in sealing the joint of the tape formed into a tube shape, so that the composite wire produced lacks the ability to keep the core out of contact with air. As a result, the core is readily oxidized or gets damp while the linear additive is stored. The joint of the covering sometimes fails, resulting in the core separating itself from the covering.

SUMMARY OF THE INVENTION

The present invention obviates the aforementioned problems encountered with regard to the production of a linear additive for molten iron and steel. The method of production of a wire shaped composite addition material, i.e., a linear additive, provided by the present invention enables to produce, with a high degree of efficiency, an elongated linear addition material forming the core is high in coherence and impervious to the influences of air and humidity. The outstanding characteristics of the invention are that at least one addition agent selected from the group consisting of calcium, magnesium and aluminum in powder or particulate form is formed into a wire of a predetermined size by extrusion, and the wire produced is enveped and sealed by a tape of iron or steel which is circularly shaped such that one widthwise marginal portion is folded tightly over the other widthwise marginal portion in overlapping relationship.

If the particle size of the addition agent or agents in powder or particulate form is too small, the core wire of the linear additive will contain large quantities of oxides and there will be the hazard of ignition when the core wire is produced by extrusion. Therefore, the addition agent or a mixture of the agents used as addition material in the invention preferably should have a suitable particle size.

The addition material for forming the core wire according to the invention may comprise an addition agent singly or a mixture of a plurality of addition agents. The addition agent or agents in powder or particulate form are made into the core wire of a predetermined size by an extrusion process. The temperature at which extrusion is carried out is preferably below 450° C., because there will be the hazard of ignition due partly to the heat produced during processing or the addition material will become too oxidized to be of any use if the temperature is too high. It goes without saying that the temperature at which extrusion is carried out should not be too low, because the operation efficiency with which extrusion is carried out will be lowered if the extrusion temperature is too low. In this regard, it is essential that extrusion of the core wire be carried out at a proper speed. If the speed of extrusion is too high, the amount of heat produced during processing will increase and there will be the increased hazard of ignition. Moreover, the surface of the core wire produced will be low in quality.

The addition agent or agents in powder or particulate form made into the core wire in this way are highly compressed and therefore have a high degree of coherence. The core wire is subsequently enveloped and sealed by a tape of iron or steel which is circularly shaped such that one widthwise marginal portion thereof is folded tightly over the other widthwise marginal portion thereof in overlapping relationship to provide a covering to the core wire. In performing this enveloping and sealing operation, the tape of iron or steel is arranged such that its length is aligned with the longitudinal axis of the core wire extruded from the extruder. The tape used has a thickness of 0.1 to 0.4 millimeter and a width which is greater than the length of the circumference of the core wire. The exact thickness of the tape of iron or steel may vary depending on the type of metal and the temperature of the molten metal to which the linear additive is applied, and the rate at which the linear additive is added to the molten metal. If the thickness is below 0.1 millimeter, the covering will melt immediately after the linear additive is added to the molten metal and the addition agent or agents in the form of the core wire will react with the molten metal before the linear additive penetrates the molten metal to a sufficient depth, thereby making it impossible to treat the molten metal satisfactorily. On the other hand, if the thickness is over 0.4 millimeter, the melting of the covering will be delayed to an undesirable degree. This may cause all or parts of the linear additive to float to the surface of the molten metal due to the difference in buoyance before the addition material is released into the molten metal, thereby making it impossible to treat the molten metal satisfactorily.

The portion of the covering made up of opposite marginal portions of the tape folded tightly one over the other in overlapping relation to provide overlapping layers of the covering is sufficiently great in circumferential extent to ensure that the covering is sealed sufficiently tightly to protect the core wire when the linear additive is stored and that the joint of the covering does not readily break open when the linear additive is put to use. When these factors are taken into consideration, the overlapping layers of the covering are required to have a circumferential extent of over 60 degrees of the outer periphery of the linear additive when seen in transverse cross section. If the overlapping layers of the covering are too large in circumferential extent the thickness of the covering will be increased and the problems discussed above will be encountered. Thus the circumferential extent of the overlapping layers of the covering will be preferably about 180 degrees at its maximum. In the event that the thickness of the tape is smaller than the above-described range, the circumferential extent of the overlapping layers of the covering may exceed 180 degrees. However, if this is the case, difficulty will be experienced in carrying out the production of the linear additive or in putting the same to practical use. If the circumferential extent of the overlapping layers of the covering is to be in the aforesaid range or between 60 and 180 degrees, the width of the tape of iron or steel will be about 1.16 to 1.5 times the circumferential length of the core wire.

The tape of iron or steel can be circularly shaped such that one widthwise marginal portion thereof is folded tightly over the other widthwise marginal portion thereof in overlapping relationship as described above. To attain the end, rolls, dies and other members may be used in any form of combination as desired. There are several known combinations and the method according to the invention can be carried into practice by using any one of the known combinations. The linear additive in the form of a composite wire produced in this way is preferably compressed somewhat to reduce its diameter in a final step in order to ensure that the overlapping layers of the covering are tightly fastened together and the covering is maintained in intimate contact with the core wire.

The core wire of the addition material produced by extrusion consists of a completely compacted mass of powders or particles in the form of a solid and therefore the core wire may be deformed by applying external forces. Accordingly, the underlying layer of the overlapping covering layers invades the core wire when the marginal portions of the tape are folded tightly one over the other in overlapping relationship, so that a small tunnel-shaped gap is seldom formed between the covering and the core wire. However, in case such gap is formed, an additional step may be provided as a final step or a step immediately before the final step, so as to remove the gap.

DESCRIPTION OF THE PREFERRED EMBODIMENT

A preferred embodiment of the invention will now be described with reference to the drawings. It will be understood, of course, that the invention is not limited to the embodiment shown and described, since many modifications may be made, and it is contemplated, therefore, by the appended claims, to cover any such modifications as fall within the true spirit and scope of this invention.

Figure 1:
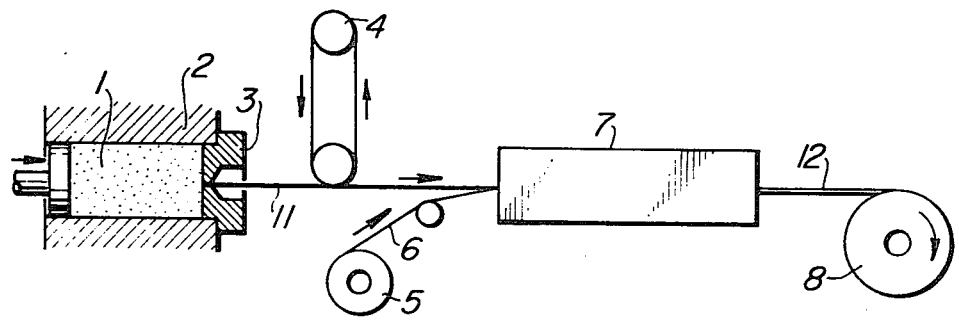
FIG. 1 is a schematic view of one form of apparatus adapted to carry the method according to the invention into practice.

In FIG. 1, the solid wire consisting of calcium and aluminum which form a mixture is designated by the reference numeral 11. In producing the wire 11, an addition material 1 which is a mixture of calcium and aluminum in powder or particulate form mixed in a predetermined ratio, e.g. 6 parts of calcium and 4 parts of aluminum or 8 parts of calcium and 2 parts of aluminum, is placed in a container 2 of a hot extruder and extruded through an aperture of a die 3 at a temperature in a range between 300° and 380° C., the addition material 1 thus extruded being in the form of a length of wire having a diameter in a range between 4.2 and 6.4 millimeters. By continuously extruding successive batches of the powder or paticulate mixture indefinitely long lengths of wire 11 are formed.

The extruded solid wire 11 is passed through an accumulator 4 and then led to a covering applying device 7 together with a tape 6 of low carbon steel successively paid out of a reel 5. The tape 6 has a predetermined thickness, e.g. 0.2 or 0.3 millimeter, and a width which is e.g. 1.4 times the length of the circumference of the wire 11.

The covering applying device 7 comprises an inlet for bending the tape 6 widthwise in a U-shaped cross-sectional form, an outlet having an inner diameter which is slightly greater than the outer diameter of the wire 11, and means mounted intermediate between the inlet and outlet for gradually bending inwardly opposite marginal portions of the U-shaped tape 6 so that finally one marginal portion is folded tightly over the other marginal portion in overlapping relationship.

Figure 2:
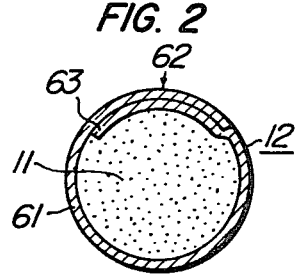
FIG. 2 is a transverse sectional view of a defect-free linear additive produced by the method according to the invention.

By passing the tape 6 through the covering applying device 7, it is possible to gradually envelop the wire 11 by the tape 6 moving along the longitudinal axis of the wire 11 till the opposite marginal portions of the tape are tightly folded one over the other in overlapping relationship, so that the tape 6 and the wire are formed into a composite wire 12 shown in FIG. 2 and wound on a take-up reel 8.

The composite wire 12 produced as aforementioned can be stored or used without requiring any special precaution, because the presence of an overlying layer 62 of the covering 61 is effective to keep the core wire 11 out of contact with the atmosphere. To avoid oxidation of the covering 61, the covering 61 may be subjected to an anticorrosion treatment.

An underlying layer 63 of the covering 61 is disposed beneath the overlying layer 62. Normally no tunnel-shaped gap 13 shown in FIG. 3 is formed between the covering 61, the core wire 11 and the underlying layer 63, because the composite wire 12 is compressed at the outlet of the device and the underlying layer 63 of the covering 16 is usually depressed into the core wire 11.

Figure 3:
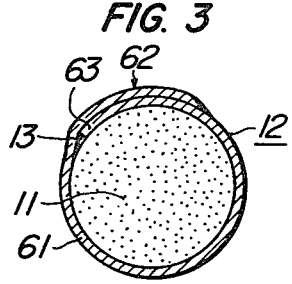
FIG. 3 is a transverse sectional view of a linear additive produced by the method according to the invention and having a tunnel-shaped gap formed between the covering and the core wire.

In the event that the gap 13 shown in FIG. 3 is formed within the composite wire 12, a finishing die (not shown) may be arranged between the device 7 and the take-up reel 8 so as to remove the gap 13. The forming of the gap 13 can also be prevented by bringing the marginal portion of the tape 6 into an inclined position beforehand, before the marginal portion is bent to form the underlying portion 63 of the covering 61.

The tensile strength and the elongation percentage of the composite wire 12 produced as aforesaid are shown in the table below.

Table

| Wire Diameter (mm) | Tensile Strength (kg/mm$^2$) | Elongation Percentage (%) |
| --- | --- | --- |
| 4.8 | 17.1 | 20.5 |
| 7.0 | 14.3 | 19.8 |

The above-described values of the elongation percentage represent the maximum percentages of elongation achieved before the core wire is torn apart. The fact that the elongation percentages are high in value shows that the core wire of the addition material according to the invention is highly compact.

The above description applies equally to the case wherein the core wire consists of an addition material which is a mixture of magnesium and calcium or magnesium and aluminium and to the case wherein the core wire consists of an addition material which is either magnesium or calcium. The invention offers advantages in handling an addition material which is a mixture of addition agents containing as the principal constituent calcium or magnesium which are active and highly reactive with moisture.

Figure 4:
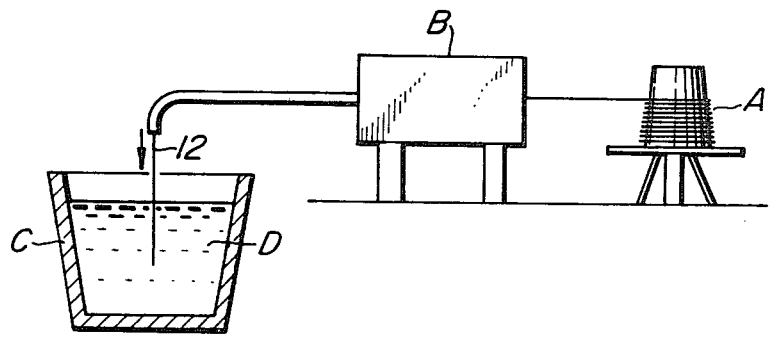
FIG. 4 schematically shows the arrangement in which the linear additive produced by the method according to the invention is put to use.

The composite wire 12 which is a linear additive, i.e. a wire shaped composite material, produced by the method according to the invention is wound in coil form for storing as designated by the symbol A of FIG. 4. When the linear additive produced by the method according to the invention is put to use, the composite wire 12 is uncoiled and delivered, as shown in FIG. 4, to a wire feed device B which comprises a wire straightener and pinch rolls arranged in combination and in which the composite wire 12 is straightened into a linear form. Since the overlying layer 62 of the covering 61 has a relatively large circumferential extent, the overlying layer 62 does not separate itself from the underlying layer 63 when the composite wire 12 is straightened as aforesaid. From the device B, the linear additive is continuously fed, through a supply tube, to a molten metal D in a container C which may be a ladle, tundish or mold. Alternatively, the linear additive may be fed directly to a stream of molten metal while the latter is being fed to the container C.

From the foregoing description, it will be appreciated that the present invention provides a simple and efficient method which enables to produce a linear additive comprising an addition material which may be an addition agent or a mixture of addition agents in the form of a compact core wire which is impervious to the influences of air and humidity, the method merely comprising the steps of extruding the addition material in powder or particulate form to provide the core wire and then enveloping and sealing the core wire by a tape of iron or steel, the tape being shaped such that one widthwise marginal portion thereof is folded tightly over the other widthwise marginal portion thereof in overlapping relationship so as to provide a covering to the core wire. By following these steps, it is possible to provide the core wire with the covering of iron or steel, the core wire being maintained in intimate contact with the covering and kept out of contact with atmosphere. Thus the linear additive produced by the method according to the invention can be stored and used with ease, and the invention is therefore high in industrial value.

We claim:

1. A method of production of a continuous length of composite wire for introduction as a linear additive into the interior of a melt of iron or steel comprising the steps of:
   (a) extruding an addition material comprising at least one agent selected from the group consisting of calcium, magnesium and aluminum, in particulate form, to produce a compact wire of a predetermined size, and
   (b) simultaneously with said extrusion enveloping and sealing said wire within a continuous metal covering by folding a tape of iron or steel tightly around said wire so that the tape is aligned parallel to the axis of the wire and that one widthwise marginal portion of the tape is tightly folded over the other widthwise marginal portion thereof in overlapping relation to produce a composite wire, said tape having a width, which is greater than the length of the circumference of said wire.

2. A method as claimed in claim 1, wherein said addition material is a mixture comprising as a principal constituent one addition agent selected from the group consisting of calcium, magnesium and aluminum, and as an ancillary constituent at least another addition agent selected from the same group.

3. A method as claimed in claim 1, wherein said addition material is heated to a temperature not higher than 450° C. when extruded to provide the wire.

4. A method as claimed in claim 1, wherein said tape of iron or steel has a thickness in a range between 0.1 and 0.4 millimeter.

5. A method as claimed in claim 1, wherein the two widthwise marginal portions of the tape of iron or steel folded tightly one over the other in overlapping relationship have a circumferential extent in a range between 60 and 180 degrees of the composite wire as seen in transverse cross section.

6. A method as claimed in claim 1 further comprising the step of compressing the composite wire to positively seal the covering.

7. A method as claimed in claim 1, whereby the steps of producing a wire of an addition material by extrusion and enveloping and sealing said wire with an iron or steel tape are carried out in one continuous operation.

* * * * *